(12) United States Patent
Tsurumune et al.

(10) Patent No.: US 6,842,281 B2
(45) Date of Patent: Jan. 11, 2005

(54) OBSERVATION DEVICE, ULTRAVIOLET MICROSCOPE AND OBSERVATION METHOD

(75) Inventors: Atsushi Tsurumune, Odawara (JP); Jiro Mizuno, Yokohama (JP); Shinichi Ito, Yokohama (JP); Riichiro Takahashi, Yokohama (JP); Tatsuhiko Ema, Kamakura (JP)

(73) Assignees: Nikon Corporation, Tokyo (JP); Kabushiki Kaisha Toshiba, Tokyo (JP)

( * ) Notice: Subject to any disclaimer, the term of this patent is extended or adjusted under 35 U.S.C. 154(b) by 57 days.

(21) Appl. No.: 10/133,626

(22) Filed: Apr. 29, 2002

(65) Prior Publication Data

US 2003/0202238 A1 Oct. 30, 2003

(30) Foreign Application Priority Data

Apr. 27, 2001 (JP) ........................................ 2001-132239

(51) Int. Cl.[7] ............................ G02B 21/00; G02B 11/04
(52) U.S. Cl. ........................................ 359/368; 359/507
(58) Field of Search ........................... 359/350–361, 359/368–390, 507–512; 355/43–73; 156/643; 250/492.1

(56) References Cited

U.S. PATENT DOCUMENTS

| | | | | |
|---|---|---|---|---|
| 4,801,352 A | * | 1/1989 | Piwczyk | .................. 156/345.5 |
| 5,430,303 A | * | 7/1995 | Matsumoto et al. | ...... 250/492.2 |
| 5,481,401 A | * | 1/1996 | Kita et al. | ................... 359/353 |
| 5,559,584 A | * | 9/1996 | Miyaji et al. | .................. 355/73 |
| 6,452,723 B1 | | 9/2002 | Suenaga et al. | ............ 359/356 |
| 6,633,364 B2 | * | 10/2003 | Hayashi | ....................... 355/53 |

FOREIGN PATENT DOCUMENTS

| | | |
|---|---|---|
| JP | 56-151912 | 11/1981 |
| JP | 09-162117 | 6/1997 |
| JP | 2000-292704 | 10/2000 |

OTHER PUBLICATIONS

English Abstract of JP.2000–292 704.
English Abstract of JP–09–162117.
English Abstract of JP–56–151912.
U.S. Appl. No. 10/305,131, Ken Kawarabata, filed Nov. 27, 2002.

* cited by examiner

*Primary Examiner*—Thong Q Nguyen (57) ABSTRACT

An ultraviolet microscope comprises an observation device which observes a specimen with ultraviolet light; a gas supply device which, during the observation with ultraviolet light, supplies an inert gas to surroundings of the specimen; and a timing control device which controls supply timing of the inert gas by the gas supply device, and the timing control device controls the gas supply device so as to cause preliminary supply of the inert gas before the observation of the specimen with ultraviolet light, and also so as to cause regular supply of the inert gas at least during the observation of the specimen with ultraviolet light.

20 Claims, 7 Drawing Sheets

OBSERVATION DEVICE, ULTRAVIOLET MICROSCOPE AND OBSERVATION METHOD

INCORPORATION BY REFERENCE

The disclosure of the following priority application is herein incorporated by reference:

Japanese Patent Application No. 2001-132239, filed Apr. 27, 2001.

BACKGROUND OF THE INVENTION

1. Field of the Invention

The present invention relates to an observation device, an ultraviolet microscope, and an observation method which observe a specimen by light in the ultraviolet region or the deep ultraviolet region.

2. Description of Related Art

An ultraviolet microscope is known from the prior art which observes a specimen by light in the ultraviolet region or the deep ultraviolet region (light whose wavelength is 356 nm, 266 nm, 248 nm or the like will generally be termed "ultraviolet light"). Because ultraviolet microscopes have high resolving power as compared with optical microscopes which utilize visible light, they are nowadays employed in fields in which miniaturization is progressing.

In this connection, in the semiconductor field, the miniaturization of patterns on wafers has progressed conspicuously along with the great increase in the integration of semiconductor elements. In recent years, the line width of patterns has been approximately from 0.13 $\mu$m to 0.24 $\mu$m. Since a pattern which has been miniaturized to such an extent cannot be observed with an optical microscope which utilizes visible light, the use of ultraviolet microscopes is being investigated in the semiconductor field as well.

Figure 9:
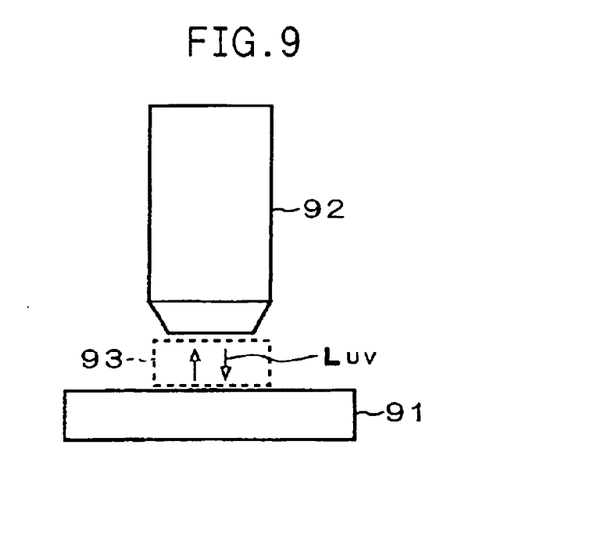
FIG. 9 is a figure for explanation of the problem to be solved in the present invention.

However, since with an ultraviolet microscope according to the prior art the specimen is observed in air in the same way as with a conventional optical microscope which utilizes visible light, therefore, as shown in FIG. 9, oxygen in the air 93 which is present between the specimen 91 and the objective lens 92 is converted into ozone by the ultraviolet light LUV, and furthermore a portion of the ozone becomes oxygen plasma (active oxygen), and this causes undesirable damage to the surface of the specimen 91.

For example, in the case of a specimen 91 which consists of a resist pattern formed upon a wafer, such as is used in a semiconductor manufacturing process, the surface of the resist pattern can easily be removed by the oxygen plasma (the active oxygen) in the air 93, which is undesirable. In other words, dissociation reaction of the resist molecules upon the surface of the resist pattern takes place due to the oxygen plasma (the active oxygen), and the dissociated resist molecules which have been converted into low molecular weight are undesirably evaporated or transpired due to combination with the oxygen in the air 93.

Furthermore, if the wavelength of the ultraviolet light LUV for the ultraviolet microscope is close to the exposure light wavelength when forming the resist pattern (which generally nowadays is 248 nm), when observing with the ultraviolet light LUV, sometimes the resist pattern is undesirably exposed for a second time. Due to this, dissociation reaction of the resist molecules takes place in the areas which are irradiated with the ultraviolet light LUV, and this causes damage in the same manner as described above.

SUMMARY OF THE INVENTION

The objective of the present invention is to propose an observation device, an ultraviolet microscope, and an observation method which can alleviate damage to the specimen caused during observation with ultraviolet light.

An ultraviolet light observation device which observes a specimen with ultraviolet light, in the present invention, comprises a gas supply device which, during the observation with ultraviolet light, supplies an inert gas to surroundings of the specimen. It is preferable in this ultraviolet light observation device to provide a timing control device which controls supply timing of the inert gas by the gas supply device, and that the timing control device controls the gas supply device so as, along with performing preliminary supply of the inert gas before the observation of the specimen with ultraviolet light, to supply the inert gas regularly at least during the observation with ultraviolet light.

An ultraviolet microscope in the present invention comprises an observation device which observes a specimen with ultraviolet light; and a gas supply device which, during the observation with ultraviolet light, supplies an inert gas to surroundings of the specimen.

It is preferable in this ultraviolet microscope to provide a timing control device which controls supply timing of the inert gas by the gas supply device, and that the timing control device controls the gas supply device so as to cause preliminary supply of the inert gas before the observation of the specimen with ultraviolet light, and also so as to cause regular supply of the inert gas at least during the observation of the specimen with ultraviolet light. In this case, the timing control device may cause the preliminary supply of the inert gas during preparation for the observation by ultraviolet light. Furthermore, the timing control device may also cause a start of the regular supply of the inert gas according to a completion of the preparation for the observation by ultraviolet light.

It is desirable that the timing control device causes stopping of the regular supply of the inert gas according to a completion of the observation by ultraviolet light.

A visible light observation device which observes the specimen with visible light may also be provided, and it is preferable that the timing control device causes the preliminary supply of the inert gas from a completion of the observation with visible light until a start of the observation with ultraviolet light.

The gas supply device may comprise a flow amount control device which controls a flow amount of the inert gas which is being supplied from the gas supply device, and it is desirable that the flow amount control device increases the flow amount of the inert gas according to a timing of starting of the regular supply of the inert gas bathe gas supply device. In this case, it is preferable to further comprise a storage device which stores in advance a set value related to the flow amount of the inert gas which is being supplied from the gas supply device, and the flow amount control device may control the flow amount of the inert gas based upon the set value stored in the storage device. The gas supply device may further comprise a detection device which detects the flow amount of the inert gas being supplied by the gas supply device, and it is desirable that the flow amount control device adjusts the flow amount of the inert gas so that a value detected by the detection device and the set value stored in the storage device agree with one another. Furthermore, it is preferable to further comprise a warning device which emits an external warning when the value detected by the detection device becomes less than a predetermined threshold value. Moreover, the warning device may stop the observation of the specimen by ultraviolet light, when the detected value becomes less than the threshold value during the regular supply of the inert gas by the gas supply device.

It is desirable that the inert gas is nitrogen gas. Furthermore, the inert gas may be one which inhibits a resist coated upon a surface of the specimen from converting into low molecular weight.

It is desirable that the ultraviolet light observation device comprises an objective lens, and that the gas supply device supplies the inert gas between the specimen and the objective lens.

It is preferable that the ultraviolet light observation device further comprises a shutter device which cuts off the ultraviolet light mechanically, and that the shutter device cuts off irradiation of the ultraviolet light upon the specimen, at times other than during the observation with ultraviolet light.

An auto focus device which automatically performs focus adjustment of the ultraviolet light observation device may also be provided, and it is desirable that before the observation with ultraviolet light, the auto focus device performs auto focus by using light for auto focusing which is different from the ultraviolet light.

A specimen observation method in the present invention comprises that supplying an inert gas to surroundings of a specimen, and that subjecting the specimen to microscopic observation under ultraviolet light.

It is desirable in the specimen observation method to perform preliminary supply of the inert gas to the surroundings of the specimen before the microscopic observation of the specimen with ultraviolet light; and to perform regular supply of inert gas to the surroundings of the specimen during the microscopic observation of the specimen with ultraviolet light.

DESCRIPTION OF THE PREFERRED EMBODIMENTS

In the following, embodiments of the present invention will be explained in detail using the figures.

Figure 1:
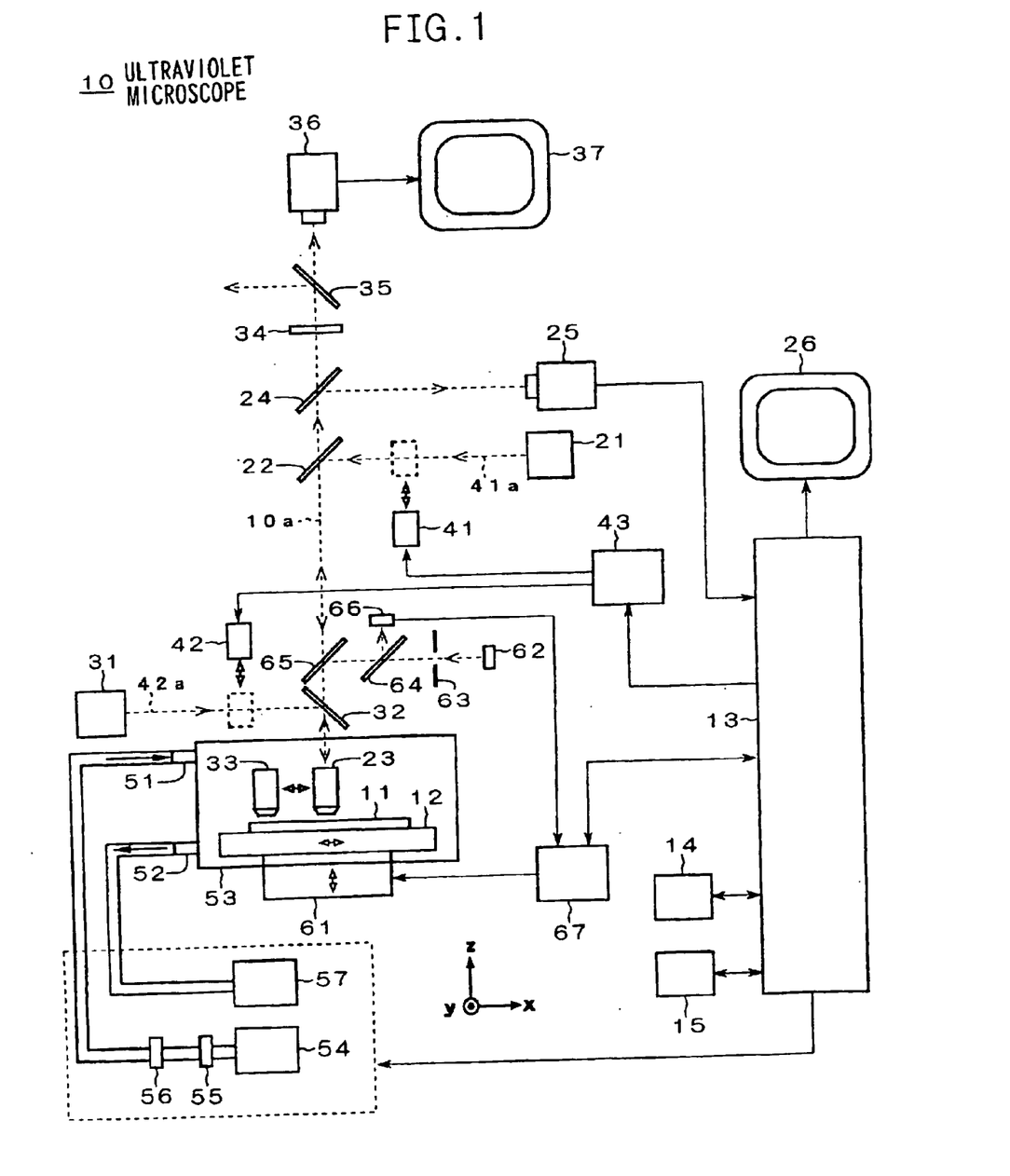
FIG. 1 is a figure showing the overall structure of an ultraviolet microscope.

The ultraviolet microscope 10 of this embodiment, as shown in FIG. 1, comprises a stage 12 which supports a specimen 11 and is movable in X and Y directions, an ultraviolet light observation section (21 through 26) which observes the specimen 11 with ultraviolet light, a visible light observation section (31 through 37) which observes the specimen 11 with visible light, a shutter section (41 through 43) which cuts off the ultraviolet light or visible light, a nitrogen gas supply section (51 through 57), an auto focus section (61 through 67), a CPU 13, a memory 14, and an actuation section 15.

The specimen 11 which is to be the subject of observation of the ultraviolet microscope 10, for example, is a semiconductor wafer upon which a resist pattern has been formed which is used in a semiconductor manufacturing process. Although the details will be described later, the ultraviolet microscope of this embodiment is an ideal device for high resolution observation of a minute resist pattern (of line width approximately 0.13 $\mu$m to 0.24 $\mu$m) formed upon the specimen 11.

The structure of the ultraviolet microscope will now be explained in concrete terms. The ultraviolet light observation section (21 through 26) comprises a light source 21 which emits ultraviolet light, a half mirror 22, an objective lens 23, a dichroic mirror 24, a CCD camera 25, and a monitor 26. Among these, the half mirror 22 both reflects ultraviolet light from the light source 21 towards the objective lens 23 and transmits ultraviolet light and visible light from the objective lens 23. And the dichroic mirror 24 both reflects ultraviolet light from the half mirror 22 towards the CCD camera 25 and is transparent to visible light.

Furthermore, an ultraviolet light source such as a mercury-xenon lamp, a mercury lamp, or a UV laser is used for the light source 21 of the ultraviolet light observation section (21 through 26). If a mercury-xenon lamp or a mercury lamp is used as the light source 21, it is desirable to insert a wavelength selection filter which picks up some wavelength in the ultraviolet region or the deep ultraviolet region between the light source 21 and the half mirror 22.

The objective lens 23 is an objective lens for use for ultraviolet light observation, and it is compensated for chromatic aberration, not only for ultraviolet light, but also for light for auto focusing (light in the infrared region or the far infrared region) as well. The CCD camera 25 is an image formation device for use with ultraviolet light which is sensitive in the ultraviolet region or the deep ultraviolet region, and its output terminal is connected to the monitor 26 via a CPU 13.

On the other hand, the visible light observation section (31 through 37) of the ultraviolet microscope 10 comprises a light source 31 which emits visible light, a half mirror 32, an objective lens 33, an ultraviolet light cutoff filter 34, a half mirror 35, a CCD camera 36, and a monitor 37.

Among these, the half mirror 32 both reflects visible light from the light source 31 towards the objective lens 33 and transmits ultraviolet light and visible light from the objective lens 33. The ultraviolet light cutoff filter 34 is transparent to visible light from the dichroic mirror 24, while it cuts off ultraviolet light which has leaded out from the dichroic mirror 24. And the half mirror 35 permits the passage of visible light from the dichroic mirror 24 towards the CCD camera 36, while reflecting some of this light towards an eyepiece not shown in the figure.

For example, a halogen lamp may be used for the light source 31 of the visible light observation section (31 through 37). The objective lens 33 is an objective lens for visible light observation, and it is compensated for chromatic aberration, not only for visible light, but also for light for auto focusing (light in the infrared region or the far infrared region) as well. The CCD camera 36 is an image formation device for use with visible light which is sensitive in the visible region, and its output terminal is connected to the monitor 37.

Although only a single objective lens 33 is shown in FIG. 1, it should be understood that a plurality of objective lenses 33, from low magnification to high magnification, are provided in the visible light observation section (31 through 37) of the ultraviolet microscope 10. In the following, among the plurality of objective lenses 33, the objective lens of low magnification will be termed the "low ratio objective lens 33", while the objective lens of high magnification will be termed the "high ratio objective lens 33".

The objective lens 23 of the ultraviolet light observation section (21 through 26) and the low ratio objective lens 33 and the high ratio objective lens 33 of the visible light observation section (31 through 37), described above, are fitted to an electrically operated revolving turret not shown in the figure. Due to this, any one of the objective lens 23 for ultraviolet light observation, and the low ratio objective lens 33 and the high ratio objective lens 33 for visible light observation is inserted into the observation light path 10a, according to the rotational state of the electrically operated revolving turret.

Next, the shutter section (41 through 43) of the ultraviolet microscope 10 will be explained. This shutter section (41 through 43) comprises a shutter 41 which can be inserted in between the light source 21 and the half mirror 22 of the ultraviolet light observation section (21 through 26) (i.e., into the ultraviolet illumination light path 41a), a shutter 42 which can be inserted in between the light source 31 and the half mirror 32 of the visible light observation section (31 through 37) (i.e., into the visible illumination light path 42a), and a shutter controller 43 which drives the two shutters 41 and 42 so as to open and close them.

When the shutter 41 has been removed from the ultraviolet illumination light path 41a (the open state), the ultraviolet light from the light source 21 is conducted into the observation light path 10a, so that it becomes possible to observe the specimen 11 with the ultraviolet microscope 10 with ultraviolet light. Conversely, when the shutter 41 has been inserted into the ultraviolet illumination light path 41a (the closed state), the ultraviolet light from the light source 21 is cut off by the shutter 41, so that it is not guided into the observation light path 10a.

Furthermore, when the shutter 42 has been removed from the visible illumination light path 42a (the open state), the visible light from the light source 31 is conducted into the observation light path 10a, so that it becomes possible to observe the specimen 11 with the ultraviolet microscope 10 with visible light. Conversely, when the shutter 42 has been inserted into the visible illumination light path 42a (the closed state), the visible light from the light source 31 is cut off by the shutter 42, so that it is not conducted into the observation light path 10a.

Although the details will be described hereinafter, the shutter controller 43 drives the shutters 41 and 42 to open and close them based upon control signals from the CPU 13, and, during observation of the specimen 11 with ultraviolet light, it puts the shutter 41 into the opened state while it puts the shutter 42 into the closed state. Furthermore, during observation of the specimen 11 with visible light, it puts the shutter 41 into the closed state while it puts the shutter 42 into the opened state. However, the time period over which the shutter 41 is opened during observation of the specimen 11 with ultraviolet light is limited according to the shutter time period of the CCD camera 25 (the time period for building up a single frame).

Next, the nitrogen gas supply section (51 through 57) of the ultraviolet microscope 10 will be explained. This nitrogen gas supply section (51 through 57) is for supplying nitrogen gas into the space between the above described objective lens 23 for ultraviolet light observation and the specimen 11. The nitrogen gas supply section (51 through 57) of this embodiment comprises a nitrogen purge device 53 which is provided with an inlet 51 and an outlet 52 for nitrogen gas, a nitrogen gas tank 54 which is connected to the inlet 51, a flow control valve 55, a flow amount sensor 56, and a suction device 57 which is connected to the outlet 52.

The nitrogen purge device 53 is a box shaped casing which is sealed shut, and which houses the above described objective lenses 23 and 33 and the specimen 11 and the stage 12. Pure nitrogen gas is, normally, supplied into the interior of the nitrogen purge device 53 from the inlet 51. And the nitrogen gas in the interior of the nitrogen purge device 53 which has been contaminated is exhausted from the outlet 52 by the suction device 57. Provided that the nitrogen purge device 53 is generally capable of keeping the nitrogen gas in the space between the specimen 11 and the objective lens 23, its air-tightness is sufficient.

The nitrogen gas tank 54 expels nitrogen gas at a timing (described hereinafter) according to a control signal from the CPU 13. And, the flow control valve 55 adjusts the flow amount of the nitrogen gas from the nitrogen gas tank 54. The amount of adjustment of the flow control valve 55 is controlled by the CPU 13. The flow amount sensor 56 (detection means) 56 detects the flow amount of nitrogen gas from the flow control valve 55, and outputs the detected value to the CPU 13.

Next, the auto focus section (61 through 67) of the ultraviolet microscope 10 will be explained. This auto focus section (61 through 67) comprises a Z drive section 61 which drives the stage 12 in the upwards and downwards direction (the Z direction), a LED light source 62 which emits light in the infrared region or the far infrared region, a slit 63, half mirrors 64 and 65, a split sensor 66, and an AF controller 67. The slit 63 and the split sensor 66 are arranged in conjugate positions.

In this auto focus section (61 through 67), a slit image is projected upon the surface of the specimen 11 by AF light which is emitted from the LED light source 62 and passes through the slit 63. And the AF light in slit form which has been reflected by the specimen 11 is incident upon the split sensor 66. The position in which the AF light in slit form is incident upon the split sensor 66 corresponds to the amount of positional deviation in the Z direction of the specimen 11.

The AF controller 67 controls the Z drive section 61 based upon a signal which is outputted from the split sensor 66 and corresponds to the amount of positional deviation of the specimen 11, and shifts the stage 12 along the Z direction. As a result, it is possible to set the position of the specimen 11 at the focused position. The auto focus section (61 through 67) executes the above described AF operation and sets the position of the specimen 11 at the focused position, at a timing (to be explained hereinafter) corresponding to a control signal from the CPU 13.

As described above, with the ultraviolet microscope 10 of this embodiment, for both the objective lens 23 for ultraviolet light observation and the objective lenses 33 for visible light observation, chromatic aberration is compensated in the wavelength region of the AF light. Accordingly, it is possible for AF operation to be executed by the auto focus section (61 through 67), not only during observation of the specimen 11 with visible light, but also during observation of the specimen 11 with ultraviolet light.

Furthermore, in the ultraviolet microscope 10, an operating section 15 connected to the CPU 13 is an input means which the operator actuates when ordering observation to be commenced, or when moving the stage 12 in the X-Y direction, or when commanding changeover of the objective lenses (23, 33).

Yet further, in the ultraviolet microscope 10, various types of setting conditions (recipe) for performing the most appropriate ultraviolet observations are stored in the memory 14 which is connected to the CPU 13. A recipe is constituted as a lookup table. In this recipe, for example, corresponding to ultraviolet observation conditions, there may be included a value for the flow amount of nitrogen gas, a time period for discharging the nitrogen gas, a density for the nitrogen gas, a shutter time for the CCD camera 25 which is used for ultraviolet observation, and the like.

The CPU 13 executes various control functions as described hereinafter, based upon the commands which have been inputted by the operating section 15 and the recipe which is stored in the memory 14. The CPU 13 works as the "timing control device", the "flow amount control device", and the "warning device".

Figure 2:
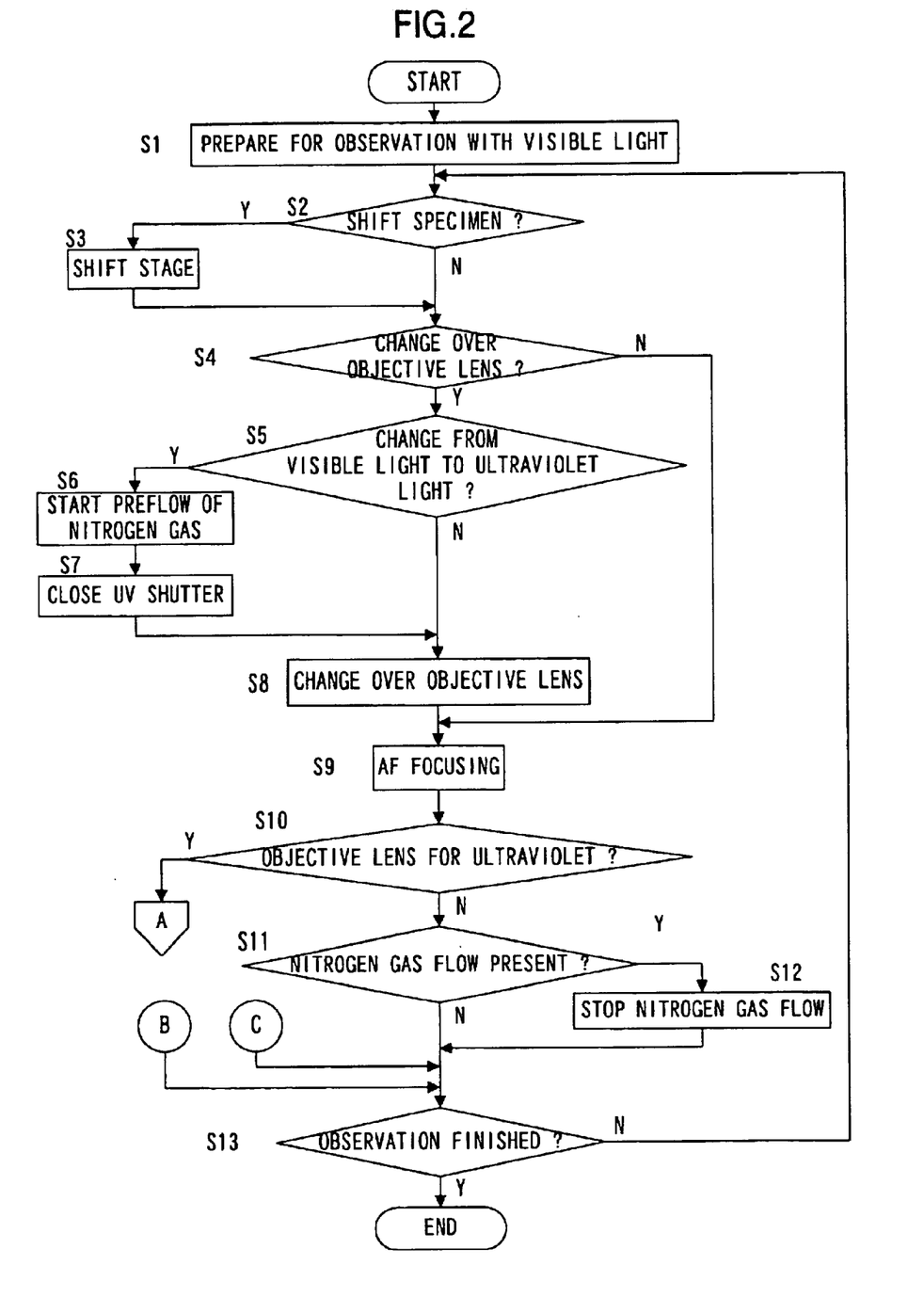
FIG. 2 is a flow chart showing a part of the operational procedure for observation with the ultraviolet microscope.
Figure 3:
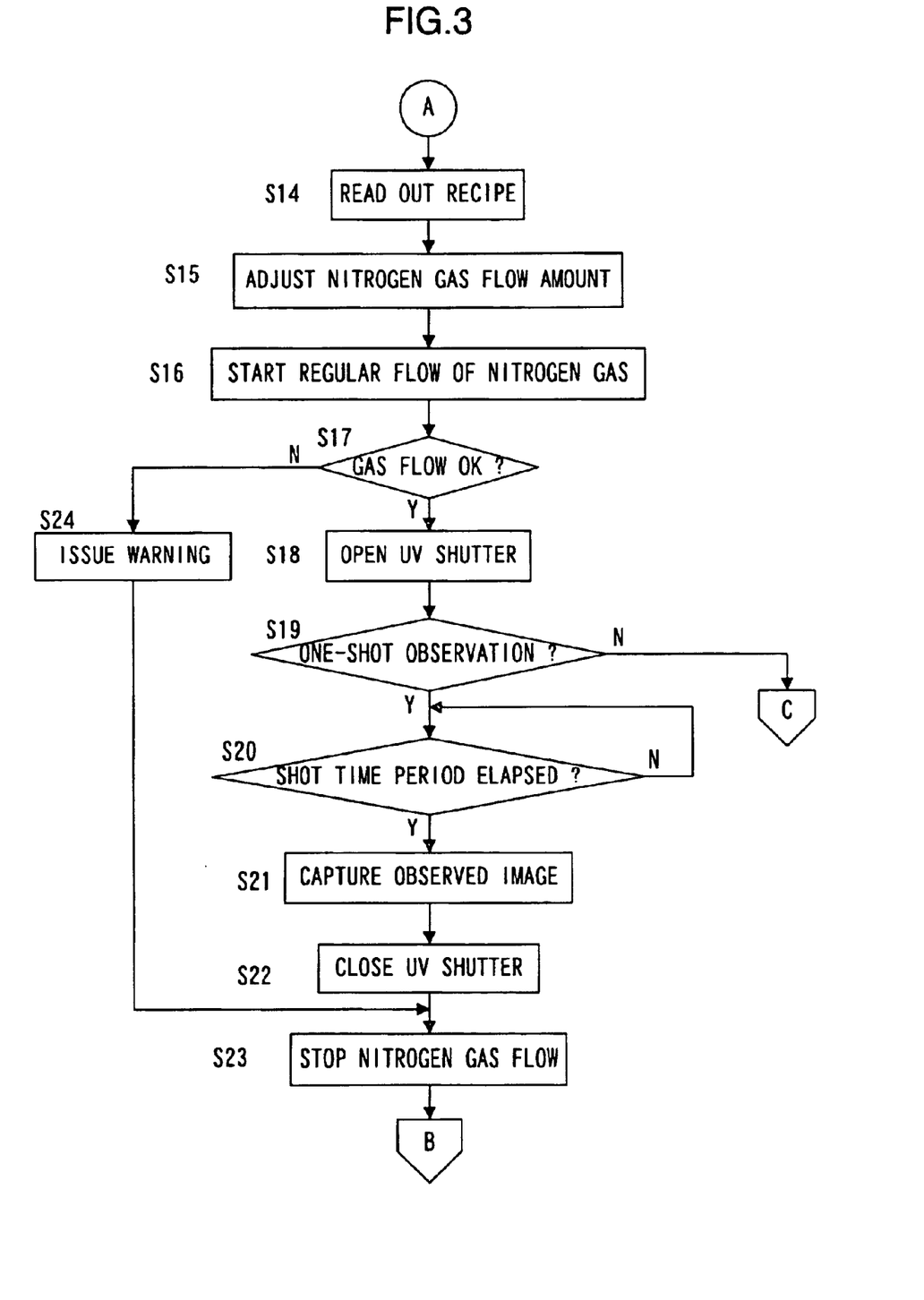
FIG. 3 is a flow chart showing the other part of the operational procedure for observation with the ultraviolet microscope.

Next, the operation of the ultraviolet microscope 10 constituted as described above for observing the specimen 11 will be explained. When the CPU 13 of the ultraviolet microscope 10 receives a command for the start of observation which has been inputted from the operating section 15, it executes the operation of observing the specimen 11 which is mounted upon the stage 12 according to the procedure of the flow chart shown in FIGS. 2 and 3. FIGS. 2 and 3 show the sequence for observation by the ultraviolet microscope 10 and the sequence for supply of nitrogen gas in combination.

An outline of the operation of observation by the ultraviolet microscope 10 is as follows. First, the position upon the specimen 11 which is desired to observe (the observation subject location) is specified by observation with visible light. Next, the observation subject location is observed with ultraviolet light while supplying nitrogen gas to the vicinity of the observation subject location. In this manner it is possible to compress the period of time during which the specimen 11 is illuminated with ultraviolet light, since the observation subject location is defined by visible light observation, in advance of the operation of observation with ultraviolet light.

Thus, when a command for commencement of observation is received from the operating section 15, the CPU of the ultraviolet microscope 10 controls the various portions of the ultraviolet microscope 10 to perform preparations for observation with visible light (in the step S1). In concrete terms, it inserts the low ratio objective lens 33 for use during observation with visible light into the observation light path 10a, and turns on the light source 31. Furthermore, it controls the shutter controller 43 to open the shutter 42.

At this time, the visible light from the light source 31 is conducted to the low ratio objective lens 33 due to reflection by the half mirror 32, and illuminates the specimen 11. And the visible light which has been reflected by the specimen 11 is conducted to the half mirror 35 via the low ratio objective lens 33, the half mirrors 32, 65, and 22, the dichroic mirror 24, and the ultraviolet light cutoff filter 34, and is split thereby into two directions.

The visible light which has passed through the half mirror 35 is incident upon the CCD camera 36, while the visible light which has been reflected by the half mirror 35 arrives at an eyepiece lens (not shown in the drawing). And a visible light image which has been captured by the CCD camera 36 is displayed upon the monitor 37 as a visible light image of the specimen 11. Accordingly, the operator of the ultraviolet microscope 10 is able to observe an image of the specimen 11 with visible light either upon the monitor 37 or via the eyepiece lens.

Next, when a command to the effect that the stage 12 is to be shifted is received from the operating section 15 (Yes in the step S2), the CPU 13 of the ultraviolet microscope 10 shifts the stage 12 in the X-Y direction (in the step S3). As a result, the specimen 11 is also shifted in the X-Y direction, and the visible light image of the specimen 11 which the operator is observing is changed. If in the step S2 no command for shifting the stage 12 has been received from the operating section 15, then the procedure of the step S3 is not executed, and the flow of control proceeds to the next step S4.

In the step S4, the CPU 13 makes a decision as to whether or not a command for changing over the objective lens (23, 33) has been inputted by the operating section 15, and if no changeover command is being inputted (No in the step S4) then the procedure in the steps S5 through S8 is not executed, and the flow of control proceeds to the step S9. If a changeover command has been inputted (Yes in the step S4), then the steps S5 through S8 which will be explained hereinafter are executed.

Supposing that at the present time point the objective lens (23, 33) is not to be changed over, then the state in which the low ratio objective lens 33 for visible light observation is inserted into the observation light path 10a is maintained. In the step S9, the CPU 13 controls the AF controller 67 and executes the AF procedure, and determines the position of the specimen 11 to the focal position of the low ratio objective lens 33. By doing this, the operator of the ultraviolet microscope 10 is able to observe a visible light image of the specimen 11 in the focused state upon the monitor 37 or via the eyepiece lens.

Next, the CPU 13 makes a decision (in the step S10) as to whether or not the objective lens 23 for observation with ultraviolet light is inserted in the observation light path 10a at the present time point. And if the objective lens 33 for observation with visible light is inserted (No in the step S10), then the flow of control proceeds to the step S11, and the presence or absence of nitrogen gas flow is detected based upon the value detected by the flow amount sensor 56 of the nitrogen gas supply section (51 through 57).

If the result of detection in the step S11 is that the nitrogen gas is flowing (Yes in the step S11), then the flow of control proceeds to the step S12, and the nitrogen gas tank 54 is controlled to stop the flow of nitrogen gas. After this, the flow of control proceeds to the step S13. Conversely, if the nitrogen gas is not flowing (No in the step S11), then the flow of control proceeds to the step S13 without executing the procedure in the step S12.

It should be understood that, if the result of the decision in the step S10 described above is that the objective lens 23 for ultraviolet light observation is inserted in the observation light path 10a (Yes in the step S10), then the flow of control proceeds to the step S13 in FIG. 2 after the procedure in the steps S14 through S24 of FIG. 3 has been executed. The steps S14 through S24 of FIG. 3 will be explained hereinafter.

In the step S13 of FIG. 2, the CPU 13 makes a decision as to whether or not the observation operation with the ultraviolet microscope 10 is to be finished, and if it is not to be finished (No in the step S13) then the flow of control returns to the procedure of the step S2. Therefore, if the low ratio objective lens 33 for visible light observation is inserted into the observation light path 10a, the CPU 13 comes to continue visible light observation using the low ratio objective lens 33 (continuous observation) while repeating the procedures of the steps S2 through S4 and S9 through S13. During this period, the operator of the ultraviolet microscope 10 shifts the stage 12 while observing the visible light image of the specimen 11 under low magnification in the focused state, and is able to perform position regulation to any range within the specimen 11 (including the observation subject location).

And, when a command to change over the objective lens (23, 33) has been inputted by the operating section 15 (Yes in the step S4), the CPU 13 proceeds to the step S5, and makes a decision as to whether or not it is a command to change over from the objective lens 33 for visible light observation to the objective lens 23 for ultraviolet light observation.

Now, the case that the command which has been inputted through the operating section 15 is a command to change over from the low ratio objective lens 33 for visible light observation to the high ratio observation lens 33 (No in the step S5) will be explained. In this case the CPU 13 proceeds to the step S8 without executing the procedures of the steps S6 and S7, and inserts the high ratio objective lens 33 for visible light observation into the observation light path 10a.

After this, in the state with the high ratio objective lens 33 for visible light observation inserted into the observation light path 10a, the CPU 13 comes to continue visible light observation (continuous observation) while repeating the procedures of the steps S2 through S4 and S9 through S13. During this period, the operator of the ultraviolet microscope 10 shifts the stage 12 while observing a visible light image of the specimen 11 at high magnification in the focused state, and is able to specify an observation subject location upon the specimen 11 and to determine its position.

Next, the case will be explained of performing ultraviolet light observation of the observation subject location upon the specimen 11 which has been defined by the above described visible light observation. In this case, a command to change over from the objective lens 33 for visible light observation to the objective lens 23 for ultraviolet light observation is being inputted through the operating section 15 (Yes in the steps S4 and S5), so that the CPU 13 proceeds to the step S6, and starts the preparation for ultraviolet light observation.

In other words, the CPU 13 controls the nitrogen gas tank 54 and the flow control valve 55 so as to start the preliminary discharge (pre-flow) of nitrogen gas, and also starts the operation of the suction device 57. By doing this, unnecessary air which stays in the vicinity of the observation subject location upon the specimen 11 is eliminated.

Furthermore, in the step S7, the CPU 13 controls the shutter controller 43 to close the shutter 42. As a result, the visible light from the light source 31 is cut off by the shutter 42. After this, the CPU 13 turns on the light source 21 for ultraviolet light. However, since the shutter 41 is still closed at this time point, the specimen 11 is not irradiated by the ultraviolet light.

Next, the CPU 13 causes the objective lens 23 for ultraviolet light observation to be inserted into the observation light path 10a (in the step S8). Then, by controlling the AF controller 67, it sets the position of the observation subject location upon the specimen 11 to the focal position of the objective lens 23 for ultraviolet light observation (in the step S9).

After this, since at the present time point the objective lens 23 for ultraviolet light observation is inserted into the observation light path 10a (Yes in the step S10), the CPU 13 executes the procedures of the steps S14 through S24 of FIG. 3.

In the step S14, the CPU 13 reads out a recipe (various setting conditions for ultraviolet light observation) which is stored in the memory 14. And it controls (in the step S15) the flow control valve 55 based upon the flow amount value of nitrogen gas which is included in the recipe which has been read out, and starts the regular flow of nitrogen gas (in the step S16). The flow amount of nitrogen gas during the regular flow is greater than the flow amount during the pre-flow.

Here, since in the preparatory period for ultraviolet light observation (the steps S6 through S10 of FIG. 2 and the steps S14 and S15 of FIG. 3) the pre-flow of nitrogen gas is performed continuously, at the present time point (before the ultraviolet light observation is actually started) the air in the space between the objective lens 23 for ultraviolet light observation and the specimen 11 has been almost completely eliminated.

Accordingly, when in the above described step S16 the regular flow of nitrogen gas is started, it is possible to increase it to the required flow amount value in a short time period. As a result, the nitrogen gas comes to fill up the space between the objective lens 23 for ultraviolet light observation and the specimen 11 sufficiently, before the ultraviolet light observation is actually started.

Next, in the step S17, the CPU 13 makes a decision as to whether or not the regular flow of nitrogen gas is normal, based upon the detection value by the flow amount sensor 56. And if the result of the decision in the step S17 is that the nitrogen gas is flowing normally (Yes in the step S17), then the flow of control proceeds to the step S18, and the shutter 41 is removed from the ultraviolet illumination path 41a (i.e., is put into the opened state). By doing this, the ultraviolet light observation is actually started.

At this time, the ultraviolet light from the light source 21 is conducted to the objective lens 23 for ultraviolet light observation by being reflected by the half mirror 22 and passing through the half mirrors 65 and 32, so that the observation subject location upon the specimen 11 is irradiated. Then, ultraviolet light which has been reflected by the observation subject location upon the specimen 11 is conducted to the dichroic mirror 24 via the objective lens 23 for ultraviolet light observation and the half mirrors 32, 65, and 22. It is reflected by the dichroic mirror 24 and is incident upon the CCD camera 25.

Furthermore, the ultraviolet light image which is formed by the CCD camera 25 is displayed upon the monitor 26 as an ultraviolet light image of the observation subject location upon the specimen 11. Accordingly, the operator of the ultraviolet microscope 10 is able, via the monitor 26, to observe the ultraviolet light image of the observation subject location upon the specimen 11 in a properly focused state.

Since as described above the nitrogen gas has already been sufficiently charged into the space between the objective lens 23 and the specimen 11, hardly any air (including oxygen) is present there. Due to this, hardly any ozone is generated in the gap between the objective lens 23 and the specimen 11, during ultraviolet irradiation upon the specimen 11. Accordingly, it is possible reliably to alleviate damage to the observation subject location upon the specimen 11.

Furthermore, if a minute resist pattern is formed at the observation subject location upon the specimen 11, then it may happen that a process of dissociation of the resist molecules takes place upon the surface of the resist pattern, if the wavelength of the ultraviolet light which is illuminating the specimen 11 is close to the exposure wavelength when forming the resist pattern.

However since, with the ultraviolet microscope 10 of this embodiment, during observation with ultraviolet light, the space between the objective lens 23 and the specimen 11 is sufficiently charged with nitrogen gas, therefore the light resist molecules which have been dissociated to low molecular weight do not evaporated or transpire but bind again to resist molecules upon the specimen 11. In other words, dissociation to low molecular weight of the resist molecules upon the surface of the resist pattern is inhibited. Accordingly, it is possible reliably to alleviate damage to the observation subject location (the minute resist pattern) upon the specimen 11.

When in the step S18 the CPU 13 causes the shutter 41 in the ultraviolet illumination light path 41a to be opened, the flow of control proceeds to the step S19, then a decision is taken as to whether or not only a single ultraviolet light image of the observation subject location upon the specimen 11 is to be taken (single shot observation). This decision is made based upon the details of the recipe which was read in, in the step S14.

If the result of the decision in the step S19 is that single shot observation is to be performed (Yes in the step S19), then along with starting a timer, frame building up by the CCD camera 25 is started. And the flow of control proceeds to the step S20, then the system waits until the shutter time period for the CCD camera 25 which is included in the recipe has elapsed. Thus the specimen 11 is imaged by a so-called electronic shutter.

When the shutter time period for the CCD camera 25 has elapsed (Yes in the step S20), then the CPU 13 proceeds to the step S21, and the ultraviolet light image which has been formed by the CCD camera 25 is stored in the memory 14 as an ultraviolet light image (an observed image) of the observation subject location upon the specimen 11.

After the image formation by the CCD camera 25 has been completed, the CPU 13 closes the shutter 41 to complete the single shot observation by ultraviolet light (the step S22), and stops the regular flow of nitrogen gas (the step S23). After this, the flow of control proceeds to the step S13 of FIG. 2. In the step S13, as described above, a decision is made as to whether or not the observation operation by the ultraviolet microscope 10 (the operation of ultraviolet light observation at the present time point) has been completed, and if it has not been completed (No in the step S13) then the flow of control returns to the procedure of the step S2.

After this, the CPU 13 is able to continue single shot observation by ultraviolet light, in the state in which the objective lens 23 for ultraviolet light observation is inserted in the observation light path 10a, by repeating the procedures of the steps S2 through S4, S9, and S10 of FIG. 2, of S14 through S23 of FIG. 3, and S13. Therefore, the operator of the ultraviolet microscope 10 is able to have successive observation images captured, which are related to the neighborhood of the observation subject location which has been defined by the above described visible light observation.

It should be understood that, when the result of the decision in the above described step S17 is that the value detected by the flow amount sensor 56 is less than the predetermined threshold value (No in the step S17), then the CPU 13 proceeds to the step S24, and issues a warning for informing the operator that an irregularity has been detected in the regular flow of nitrogen gas. This warning is performed audibly (by an alarm) or via a display. And the flow of control then proceeds to the step S23 in which the regular flow of nitrogen gas is stopped.

Furthermore, if single shot observation by ultraviolet light is not to be performed (No in the step S19), then the CPU 13 does not execute the procedures of the steps S20 through S23, but rather proceeds to the step S13 of FIG. 2. And, in the state with the objective lens 23 for ultraviolet light observation being inserted into the observation light path 10a, continuous observation with ultraviolet light becomes possible by repeating the procedures of the steps S2 through S4, S9, S10, S14 through S19, and S13. Even during continuous observation, it is possible to change the flow amount during the regular flow of nitrogen gas, depending upon the details of the recipe which was read in, in the step S14.

Moreover if, after the above described observation with ultraviolet light (either single shot observation or continuous observation), observation with visible light is to be performed for a second time, then, since a command for changing over from the objective lens 23 for ultraviolet light observation to the objective lens 33 for visible light observation is inputted by the operation section 15 (Yes in the step S4 and N in the step S5), the CPU 13 proceeds to the step S8, and commences the preparations for visible light observation. In other words, along with inserting the objective lens 33 for visible light observation into the observation light path 10a (the step S8), the shutter 42 in the visible illumination light path 42a is opened.

After this, in the state with the objective lens 33 for visible light observation being inserted into the observation light path 10a, the CPU 13 comes to continue continuous visible light observation (continuous observation), by repeating the procedures of the steps S2 through S4 and S9 through S13. And, if the nitrogen gas which was being supplied during continuous observation with ultraviolet light as described above has not yet been stopped (Yes in the step S11), then, in the step S12, the supply of nitrogen gas is to be stopped.

As has been explained above, since according to the ultraviolet microscope 10 of this embodiment, when irradiating the specimen 11 with ultraviolet light, sufficient nitrogen gas is charged into the space between the objective lens 23 and the specimen 11 for almost no air (containing oxygen) to remain therein, accordingly almost no ozone is generated in the space between the objective lens 23 and the specimen 11. Therefore, it is possible reliably to alleviate damage to the specimen 11 at the observation subject location.

Furthermore, even if a minute resist pattern is formed upon the specimen 11 at the observation subject location, since it is possible to inhibit the dissociation (conversion into lower molecular weight) of the resist molecules upon the surface of the resist pattern, thereby it is possible reliably to alleviate damage to the observation subject location (the minute resist pattern) upon the specimen 11.

Accordingly it is possible to perform observation of the shape of a minute resist pattern (of line width approximately 0.13 $\mu$m to 0.24 $\mu$m) which has been formed by exposure upon the specimen 11, and/or measurement of the dimensions of this pattern, while hardly altering its dimensions. In other words, the ultraviolet microscope 10 of this embodiment is a suitable device for high-resolution observation of a minute resist pattern upon the surface of the specimen 11.

Furthermore, according to the ultraviolet microscope 10 of this embodiment, it is possible efficiently to perform the supply of nitrogen gas to the specimen 11 without wastage, since the nitrogen gas supply sequence is matched to the observation sequence. Yet further since, with the ultraviolet microscope 10 of this embodiment, the regular flow of nitrogen gas is performed after the pre-flow, accordingly it is possible to increase the flow up to the required flow amount value in a short time period, and it is possible to start ultraviolet light observation immediately after starting the regular flow of nitrogen gas.

Furthermore since, with the ultraviolet microscope 10 of this embodiment, the shutter 41 is provided in the ultraviolet illumination light path 41a, and this shutter 41 is opened only for a shutter period which is limited to the minimum required when the CCD camera 25 for ultraviolet light observation is capturing a single frame, and said shutter 41 is closed directly after image formation by the CCD camera 25. Therefore, it is possible to avoid unnecessarily irradiation of the ultraviolet light upon the specimen 11 for a long time period. As a result, it is possible to inhibit damage to the specimen 11 by the ultraviolet light.

Furthermore since, according to the ultraviolet microscope 10 of this embodiment, the shutter 41 is opened after the focal adjustment with the AF light in the infrared region or the far infrared region has been performed, thereby it is possible to avoid the ultraviolet irradiation upon the specimen 11 for an unnecessarily long time period. As a result, it is possible to inhibit damage to the specimen 11 by the ultraviolet light.

Furthermore since, according to the ultraviolet microscope 10 of this embodiment, the ultraviolet light observation of an observation subject location upon the specimen 11 is performed after this observation subject location has been specified by visible light observation, thereby it is possible to avoid irradiating ultraviolet light upon the specimen 11 for an unnecessarily long time period. As a result, it is possible to inhibit damage to the specimen 11 by the ultraviolet light.

It should be understood that although, with the above described embodiment, the nitrogen gas was supplied between the specimen 11 and the objective lens 23 by using the nitrogen gas supply section (51 through 57), the present invention is not limited to this structure. Two other examples for the structure other than the nitrogen gas supply section (51 through 57) will now be explained.

Figure 4:
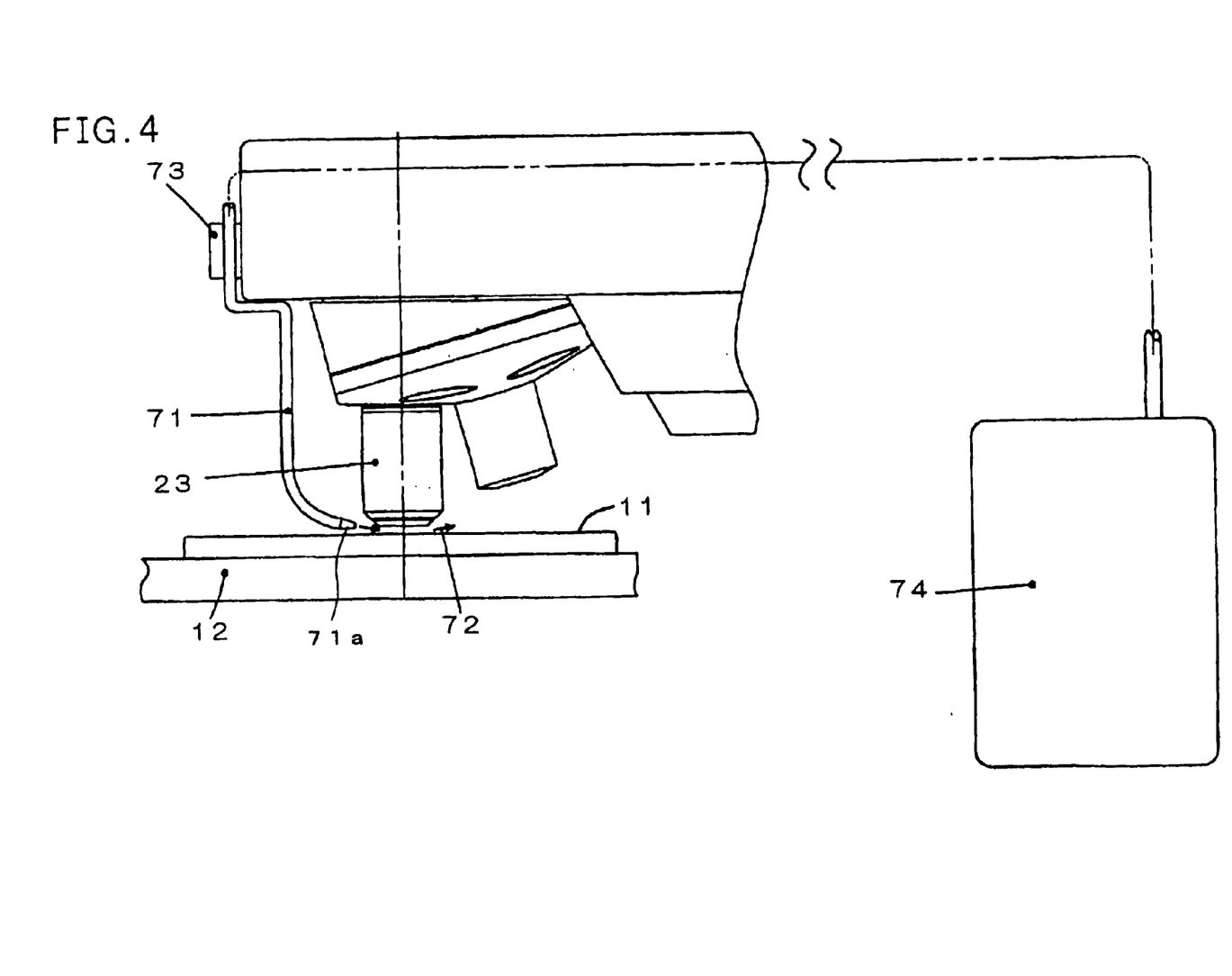
FIG. 4 is a figure showing a structural example of the nitrogen gas supply section.

FIG. 4 is an example in which, using a tube 71, nitrogen gas 72 (shown by the arrow symbol) is fed in directly under the objective lens 23. The tube 71 is supported by a fixing device 73 which is fixed to the main body of the ultraviolet microscope so that its nitrogen gas ejection aperture 71a is maintained in the vicinity of the tip portion of the objective lens 23. For the tube 71, one made of Teflon may be used. Due to this, it is possible to prevent contamination of the nitrogen gas 72 or of the specimen 11.

According to the structure of FIG. 4, the nitrogen gas 72 which has been supplied from the nitrogen gas tank 74 passes through the tube 71 and is ejected from the nitrogen gas ejection aperture 71a, and is supplied to the gap between the specimen 11 upon the stage 12 and the objective lens 23. Accordingly, it is possible to eliminate the air in the gap between the specimen 11 upon the stage 12 and the objective lens 23 and to fill said gap up with nitrogen gas.

Figure 5A:
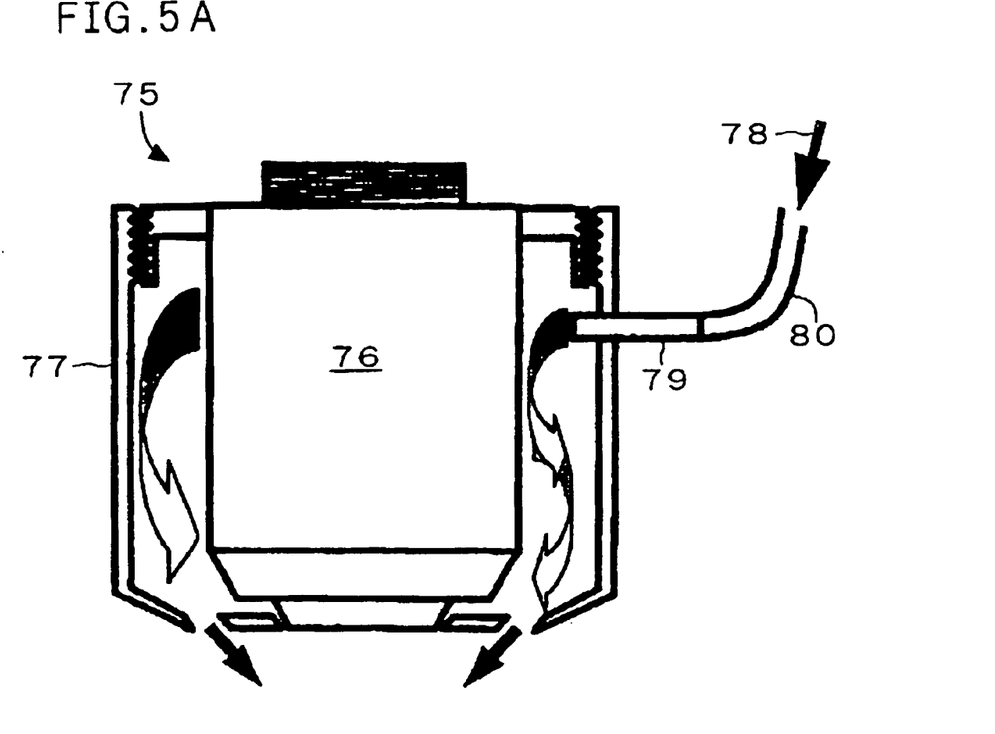
FIGS. 5A and 5B are figures showing another structural example of the nitrogen gas supply section.
Figure 5B:
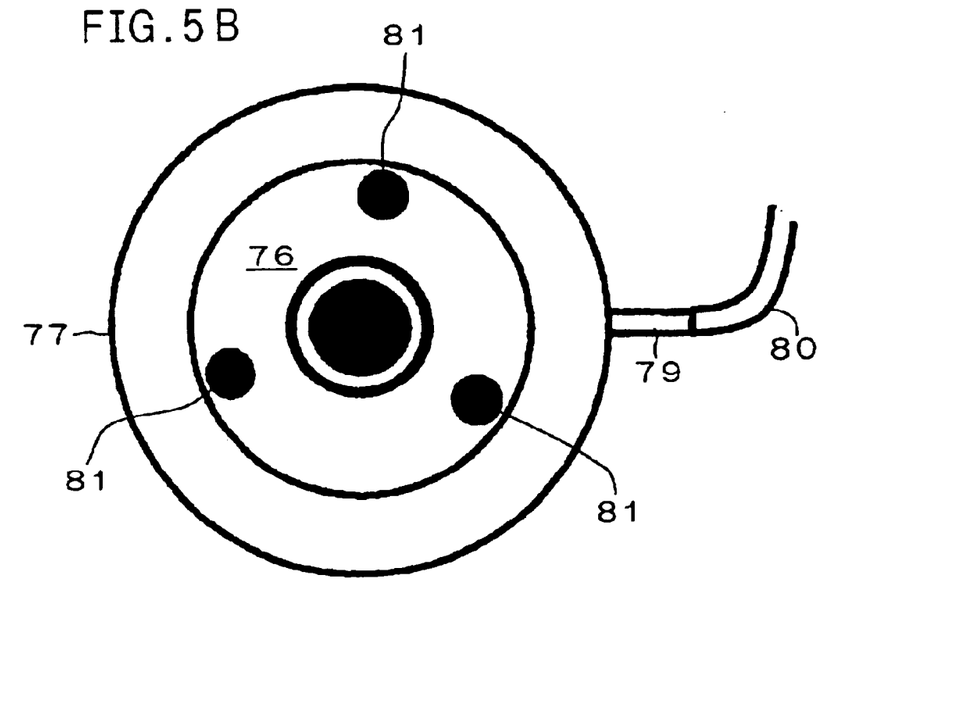

FIG. 5 are a structural example in which nitrogen gas is guided into the interior of the objective lens 75, and the nitrogen gas is expelled towards the specimen 11 from the tip portion of the objective lens 75. FIG. 5A is a sectional view of the objective lens 75, and FIG. 5B is an external view of the tip portion of the objective lens 75.

The objective lens 75 is made up from a lens support barrel 76 which supports a lens (not shown in the drawings) for ultraviolet light observation, and a cover barrel 77 which surrounds the outer circumference of the lens support barrel. The inner diameter of the cover barrel 77 is greater than the outer diameter of the lens support barrel 76. Due to this, a fixed space is ensured between the lens support barrel 76 and the cover barrel 77.

Furthermore, a pipe 79 is provided upon the side surface of the cover barrel 77 for guiding the nitrogen gas 78, and a tube 80 which is connected to a nitrogen gas tank (not shown in the drawings) is fitted to this pipe 79. Moreover, three nitrogen gas discharge apertures 81 are formed through the lower portion of the cover barrel 77.

According to the structure of FIG. 5, the nitrogen gas 78 from the nitrogen gas tank (not shown in the drawings) is conducted between the cover barrel 77 and the lens support barrel 76 via the tube 80 and the pipe 79, and is ejected towards the specimen 11 from the three nitrogen gas ejection apertures 81. Accordingly, it is possible to eliminate air in the gap between the specimen 11 and the objective lens 75 and to fill said gap with the nitrogen gas 78.

It is desirable to provide the three nitrogen gas ejection apertures 81 so that they slant in directions towards the position of the focal point of the objective lens 75, so that the nitrogen gas 78 which is ejected flows at good efficiency towards the vicinity of the central axis of the objective lens 75. Furthermore, it will be acceptable if the number of nitrogen gas ejection apertures 81 is between three and five.

Furthermore although, with the above described embodiment, during observation with ultraviolet light, a gas flow check is performed (in the step S17 of FIG. 3) before opening the shutter 41, it is preferable to perform a gas flow check in the same manner after the shutter 41 has been opened as well. And when an abnormality in the gas flow is detected, along with issuing a warning externally, it is desirable to close the shutter 41.

Furthermore, when gas flow checking is performed after opening the shutter 41, then, by performing feedback control of the flow amount adjustment section 55 based upon the value detected by the flow amount sensor 56, it is possible always to ensure that the flow amount of the nitrogen gas (the value detected by the flow amount sensor 56) and the value set in the recipe agree with one another.

Moreover although, with the above described embodiment, the example has been explained of the flow amount of the nitrogen gas during the regular flow being greater than the amount during the preliminary flow, it would also be acceptable for the flow amount of the nitrogen gas not to be varied. It would also be acceptable, after the preliminary flow of nitrogen gas, temporarily to stop the supply of nitrogen gas.

Furthermore although, with the above-described embodiment, the example has been explained of the use of nitrogen gas, a different inert gas (for example helium gas) could be used. Furthermore, it is desirable that the gas to be used is one which inhibits the resist from being converted into low molecular weight.

Yet further although, with the above described embodiment, the example has been explained of the regular flow being commenced when the preparations for ultraviolet light observation are completed, it would also be acceptable to start the regular flow after a predetermined time period from the pre-flow of nitrogen gas. This predetermined time period should be a time period over which the nitrogen gas is sufficiently charged between the objective lens for ultraviolet light observation and the specimen 11.

Furthermore, it is also possible to apply the present invention to an ultraviolet microscope which uses one and the same objective lens both for visible light and also for ultraviolet light. In this case, the operation of changing over of the objective lens becomes unnecessary. Due to this, it will be acceptable to control the nitrogen gas flow according to the changeover of observation mode.

Moreover it is desirable, not only in consideration of the shutter time period of the CCD camera 25 (the time period for building up a single frame) but also in consideration of the damage to the specimen 11 caused by the ultraviolet light, to set the time period over which the shutter 41 is opened to a time period which ensures that the amount of damage which is caused is not more than an amount permitted in advance.

Furthermore it would also be acceptable, when turning on the light source 31 for visible light (in the step S1 of FIG. 2), also to turn on the light source 21 for ultraviolet light.

Although, in the description of the above embodiment, the example of an ultraviolet microscope has been explained, it is not necessarily limited to this subject matter. The present invention can also be applied to an observation device other than a microscope. In other words, it can be applied to any observation device which observes a specimen using ultraviolet light.

Next, an example for performing the present invention will be explained.

Here, the case of the use of the above described ultraviolet microscope 10 for observing a resist pattern with 130 nm rulings formed upon a specimen 11 will be explained in concrete terms. The light source 21 of the ultraviolet microscope 10 is a source of ultraviolet light at a wavelength of 266 nm. The operation of observing the specimen 11, in this embodiment, is basically the same as the procedure of the above-described FIGS. 2 and 3. Due to this, the explanation of the basic operation will herein be omitted.

By the way, a resist pattern of 130 nm rulings is one which is formed by: (1) coating an antireflection layer and a chemically amplified resist upon a silicon substrate; (2) exposing a predetermined pattern through a reticle for exposure by reduction projection using a KrF excimer laser; and (3) after heat processing, performing development.

Now, with this embodiment, while the steps S6 through S13 of FIG. 2 and the steps S14 and S15 of FIG. 3 are being executed, a preparatory discharge of nitrogen gas (a pre-flow) is performed at a flow speed of approximately 0.1 m/sec. Furthermore, while the steps S16 through S22 of FIG. 3 are being executed, a regular discharge of nitrogen gas is performed at a flow speed of approximately 0.3 to 0.5 m/sec.

And, while performing the regular discharge of nitrogen gas (at approximately 0.3 to 0.5 m/sec), the shutter 41 is opened in the step S18, and the ultraviolet irradiation upon the specimen 11 is commenced. After this, the condition of the resist pattern upon the specimen 11 is observed via the monitor 26, and, if single shot observation is being performed, the ultraviolet light image from the CCD sensor 25 is captured (in the step S21), then, after the necessary information has been obtained, the shutter 41 is closed (in the step S22). At this time, the time period over which the ultraviolet light is irradiated upon the resist pattern upon the specimen 11 (the opening time period for the shutter 41) was approximately 15 seconds.

When subsequent procedures were performed according to a normal manufacturing process for a semiconductor integrated circuit after ultraviolet light observation by the ultraviolet microscope 10, no damage at all was found at the location upon the specimen 11 where ultraviolet light observation using the ultraviolet microscope had taken place (i.e., at the observation subject location which had been irradiated with ultraviolet light).

Moreover, the present inventors performed the following three experiments for investigating in detail the damage when performing ultraviolet light observation using the ultraviolet microscope 10. In these three experiments, the same nitrogen gas conditions as described above (flow speed during pre-flow: approximately 0.1 m/sec, flow speed during regular flow: approximately 0.3 to 0.5 m/sec) were utilized, and the damage suffered by the resist was investigated while varying the irradiation time of the ultraviolet light (of wavelength 266 nm) as a parameter.

(Experiment 1: Variation of the Dimensions of the Resist Pattern)

Figure 6:
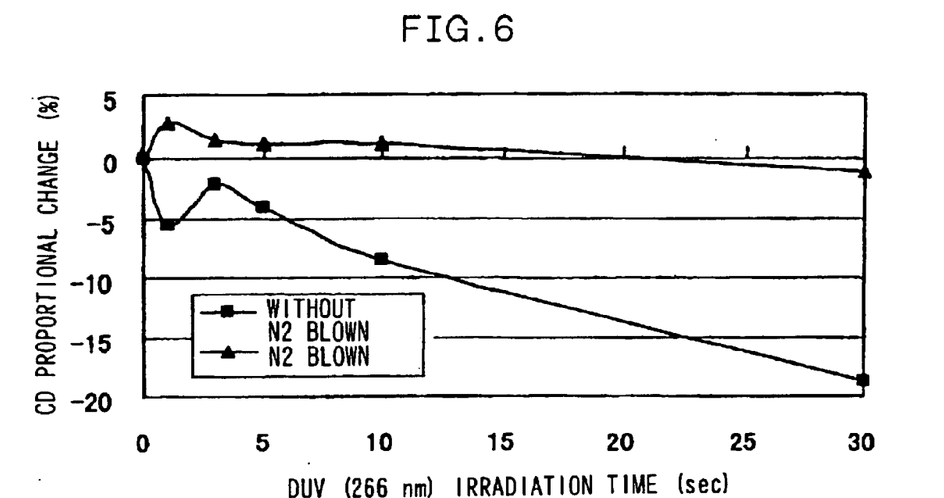
FIG. 6 is the results of experiments related to variation of the dimensions of a resist pattern.

The results of measuring changes of the dimensions of the resist pattern with respect to changes in the time of irradiation with ultraviolet light are shown in FIG. 6 (refer to "N2 BLOWN"). The horizontal axis is the time of ultraviolet irradiation, while the vertical axis is the proportional change from the reference resist pattern dimensions (i.e., from the dimensions at a location upon which no ultraviolet light was irradiated). The time periods for irradiation of ultraviolet light for which measurement was performed were 0 seconds, 1 second, 3 seconds, 5 seconds, 10 seconds, and 30 seconds. It should be understood that the results of measuring the change in the dimensions of the resist pattern when no nitrogen gas was supplied are also shown as well in FIG. 6 (refer to "SIMPLE IRRADIATION").

As will be understood from the results in FIG. 6, under ultraviolet light irradiation with the normal atmosphere to which nitrogen gas is not supplied (refer to "SIMPLE IRRADIATION"), after 30 seconds from the start of irradiation, the dimensions of the resist pattern had shrunk by approximately 18%.

By contrast, under ultraviolet irradiation in the nitrogen gas atmosphere of the present embodiment (refer to "N2 BLOWN"), even after 30 seconds from the start of irradiation, the dimensions of the resist pattern had only shrunk by approximately 1%. In other words, it was possible to inhibit the damage to the resist pattern to a remarkable extent. Accordingly, it is considered that it is desirable to perform ultraviolet light observation of the resist pattern with the ultraviolet microscope 10 in a nitrogen gas atmosphere.

(Experiment 2: Variation of the Resist Thickness Upon the Non-exposed Portion)

Figure 7:
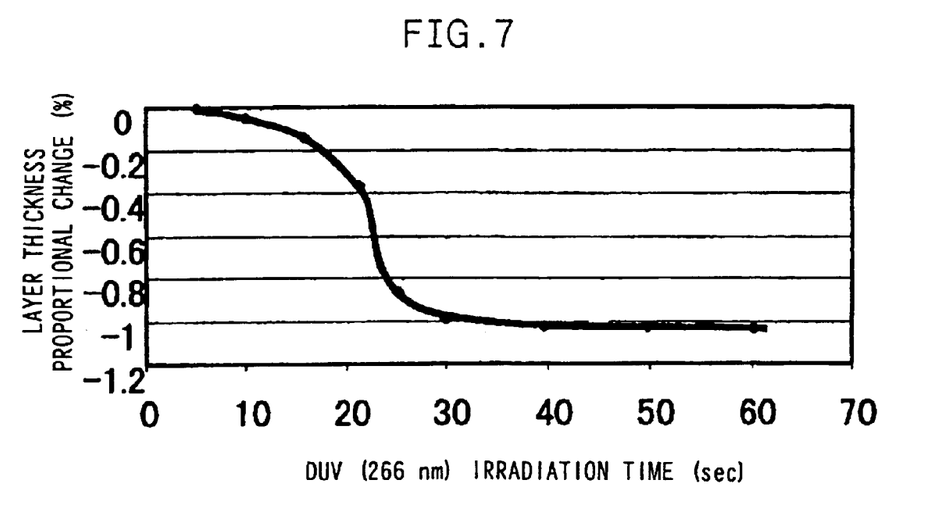
FIG. 7 is the results of experiments related to variation of the resist thickness of a non exposed portion.

The results of measuring changes in the resist thickness of the non exposed portions with respect to changes in the time of irradiation with ultraviolet light in a nitrogen atmosphere are shown in FIG. 7. By the non-exposed portions is meant the regions in which no pattern was formed. In FIG. 7, the horizontal axis is the time of irradiation with ultraviolet light, while the vertical axis is the proportional change from the reference resist layer thickness (i.e., from the layer thickness at a location upon which no ultraviolet light was irradiated). The time periods for irradiation with ultraviolet light for which measurement was performed were from 0 seconds to 60 seconds.

As will be understood from the results in FIG. 7, with ultraviolet irradiation in a nitrogen gas atmosphere, there was hardly any change in the resist thickness up to about 10 seconds from the start of irradiation. And reduction of the resist thickness started from 10 seconds, so that after 30 seconds it had diminished by about 1%. Thereafter hardly any further reduction was seen.

In other words, with ultraviolet irradiation in a nitrogen gas atmosphere, it was possible to inhibit change in the resist thickness within 0.5% if the time period for irradiation was within about 20 seconds. Accordingly, in a nitrogen gas atmosphere, it is considered to be desirable to perform the observation with ultraviolet light within 20 seconds, in order sufficiently to inhibit damage to the resist pattern.

It should be understood that, after 30 seconds from the start of irradiation, the change in the resist thickness became slow, and was almost in a stable state. It is possible to measure the dimensions and the layer thickness and so on of the resist pattern accurately by taking advantage of this tendency.

For example, it will be sufficient to measure the dimensions of the resist pattern and its layer thickness and soon, after performing irradiation of the resist pattern with ultraviolet light for 30 seconds or more, so that changes in the resist thickness due to the ultraviolet irradiation have stabilized, then to add a fixed offset value to the measured values which are obtained. This offset value may be 1% when the change in the resist thickness has stabilized.

As a result, it is possible to obtain an accurate measured value for the dimensions and the layer thickness and so on of the resist pattern while no consideration is given to the amount of damage due to the time period of irradiation with ultraviolet light. Therefore, if various measurements of the resist layer are to be performed using the ultraviolet microscope 10, it is desirable to utilize stable regions in which the amount of change rate of the layer thickness due to the irradiation by ultraviolet light is almost zero.

(Experiment 3: Variation of the Dimensions after RIE Processing)

Here, a resist pattern which was irradiated with ultraviolet light for 10 seconds and a resist pattern which was irradiated with ultraviolet light for 30 seconds were prepared, patterns of SiN layer were formed by performing anisotropic ion etching (RIE) processing using each of these resist patterns as a mask, then variation of the dimensions of the pattern of the SiN layer after this RIE processing was measured.

Figure 8:
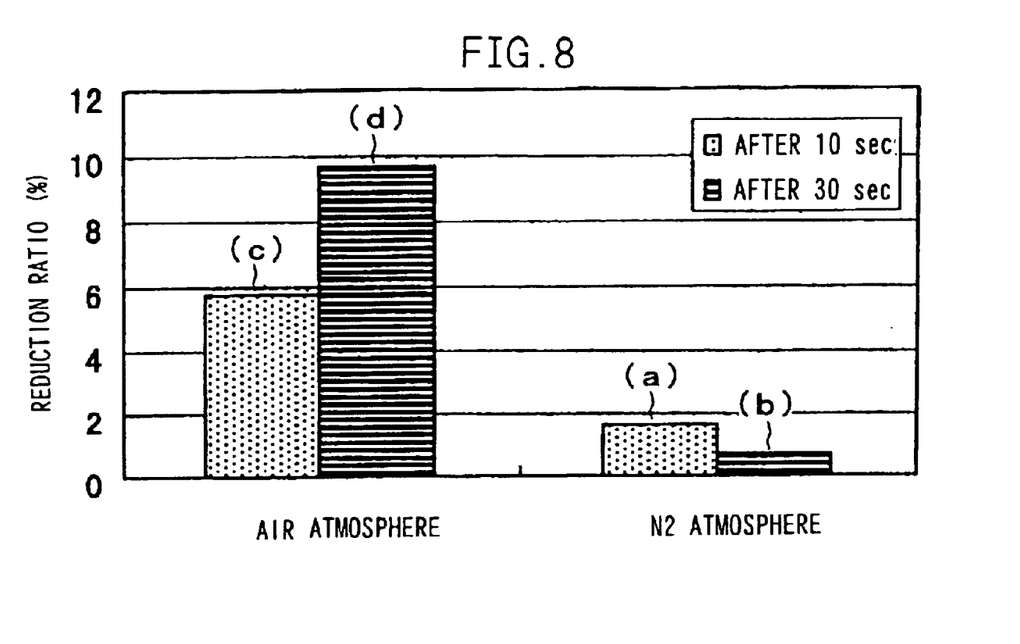
FIG. 8 is the results of experiments related to variation of the dimension, after an isotropic ion etching (Reactive Ion Etch) processing.

The results (a) and (b) of measurement in case the irradiation with ultraviolet light was performed (for 10 seconds and for 30 seconds) in a nitrogen gas atmosphere, and the results (c) and (d) of measurement in case the irradiation with ultraviolet light was performed (for 10 seconds and for 30 seconds) in a normal atmosphere to which no nitrogen gas was supplied, are shown in FIG. 8. The vertical axis in FIG. 8 is the proportional reduction of the pattern dimensions after the RIE processing from a reference (the dimensions of a location upon which no ultraviolet light was irradiated).

As will be understood from the results in FIGS. 8(c) and (d), in the case of irradiation with ultraviolet light in a normal atmosphere, a reduction of approximately 6% with 10 seconds of irradiation, and a reduction of approximately 10% with 30 seconds of irradiation, were seen in the dimensions of the pattern of SiN layer.

By contrast to this, in the case of irradiation with ultraviolet light in a nitrogen gas atmosphere, as will be understood from the results in FIGS. 8(a) and (b), a reduction of only approximately 1.5% with 10 seconds of irradiation, and a reduction of only approximately 0.7% with 30 seconds of irradiation, were seen in the dimensions of the pattern of SiN layer. This reduction is approximately within the range of variation of the dimensions due to the processes before the irradiation with the ultraviolet light. In other words, it is possible to inhibit the damage to a remarkable extent, both after 10 seconds and after 30 seconds.

From the above results it was understood that, with observation of a light sensitive photoresist which had an absorption band in the vicinity of the irradiation wavelength of the ultraviolet light of the ultraviolet microscope 10, it was possible to reduce the damage to the resist with good repeatability, in the case of performing observation over a short time period of approximately a few tens of seconds in a nitrogen gas atmosphere.

The above-described embodiments are examples, and various modifications can be made without departing from the spirit and scope of the invention.

What is claimed is:

1. An ultraviolet light observation device which observes a specimen with ultraviolet light, comprising:
    an objective lens for ultraviolet light observation that observes the specimen with ultraviolet light;
    an objective lens for visible light observation that observes the specimen with visible light;
    a gas supply device which, during the observation with ultraviolet light, supplies an inert gas to surroundings of the specimen; and
    a timing control device which controls supply timing of the inert gas by the gas supply device,
    wherein the timing control device controls the gas supply device so as to supply the inert gas when there is a changeover from the observation of the specimen with visible light to the observation of the specimen with ultraviolet light.

2. An ultraviolet light observation device as described in claim 1,
    wherein the timing control device controls the gas supply device so as, along with performing preliminary supply of the inert gas before the observation of the specimen with ultraviolet light, to supply the inert gas regularly during the observation with ultraviolet light.

3. An ultraviolet microscope, comprising:
    an objective lens for ultraviolet light observation that observes a specimen with ultraviolet light;
    an objective lens for visible light observation that observes the specimen with visible light;
    a gas supply device which, during the observation with ultraviolet light, supplies an inert gas to surroundings of the specimen; and
    a timing control device which controls supply timing of the inert gas by the gas supply device,
    wherein the timing control device controls the gas supply device so as to supply the inert gas when there is a changeover from the observation of the specimen with visible light to the observation of the specimen with ultraviolet light.

4. An ultraviolet microscope as described in claim 3,
    wherein the timing control device controls the gas supply device so as to cause preliminary supply of the inert gas before the observation of the specimen with ultraviolet light, and also so as to cause regular supply of the inert gas during the observation of the specimen with ultraviolet light.

5. An ultraviolet microscope as described in claim 4, wherein:
    the timing control device causes the preliminary supply of the inert gas during preparation for the observation by ultraviolet light.

6. An ultraviolet microscope as described in claim 5, wherein:
    the timing control device causes a start of the regular supply of the inert gas according to a completion of the preparation for the observation by ultraviolet light.

7. An ultraviolet microscope as described in claim 4, wherein:
the timing control device causes stopping of the regular supply of the inert gas according to a completion of the observation by ultraviolet light.

8. An ultraviolet microscope as described in claim 4, wherein the timing control device causes the preliminary supply of the inert gas from a completion of the observation with visible light until a start of the observation with ultraviolet light.

9. An ultraviolet microscope as described in claim 4, wherein:
the gas supply device comprises a flow amount control device which controls a flow amount of the inert gas which is being supplied from the gas supply device, and
the flow amount control device increases the flow amount of the inert gas according to a timing of starting of the regular supply of the inert gas by the gas supply device.

10. An ultraviolet microscope as described in claim 9, further comprising:
a storage device which stores in advance a set value related to the flow amount of the inert gas which is being supplied from the gas supply device, and wherein:
the flow amount control device controls the flow amount of the inert gas based upon the set value stored in the storage device.

11. An ultraviolet microscope as described in claim 10, wherein:
the gas supply device comprises a detection device which detects the flow amount of the inert gas being supplied by the gas supply device, and
the flow amount control device adjusts the flow amount of the inert gas so that a value detected by the detection device and the set value stored in the storage device agree with one another.

12. An ultraviolet microscope as described in claim 11, further comprising:
a warning device which emits an external warning when the value detected by the detection device becomes less than a predetermined threshold value.

13. An ultraviolet microscope as described in claim 12, wherein:
the warning device stops the observation of the specimen by ultraviolet light, when the detected value becomes less than the threshold value during the regular supply of the inert gas by the gas supply device.

14. An ultraviolet microscope as described in claim 3, wherein:
the inert gas is nitrogen gas.

15. An ultraviolet microscope as described in claim 3, wherein:
the inert gas is one which inhibits a resist coated upon a surface of the specimen from converting into low molecular weight.

16. An ultraviolet microscope as described in claim 3, wherein:
the gas supply device supplies the inert gas between the specimen and the objective lens for ultraviolet light observation.

17. An ultraviolet microscope as described in claim 3, further comprising:
a shutter device which cuts off the ultraviolet light mechanically, and
wherein the shutter device cuts off irradiation of the ultraviolet light upon the specimen, at times other than during the observation with ultraviolet light.

18. An ultraviolet microscope as described in claim 3, further comprising:
an auto focus device which automatically performs focus adjustment of the objective lens for ultraviolet light observation, and wherein
before the observation with ultraviolet light, the auto focus device performs auto focus by using light for auto focusing which is different from the ultraviolet light.

19. A specimen observation method, comprising:
supplying an inert gas to surroundings of a specimen when there is a changeover from microscopic observation of the specimen with visible light to microscopic observation of the specimen with ultraviolet light, and
subjecting the specimen to microscopic observation under ultraviolet light.

20. A specimen observation method as described in claim 19, further comprising:
performing preliminary supply of the inert gas to the surroundings of the specimen before the microscopic observation of the specimen with ultraviolet light; and
performing regular supply of the inert gas to the surroundings of the specimen during the microscopic observation of the specimen with ultraviolet light.

* * * * *